(12) United States Patent
Breyel

(10) Patent No.: US 8,284,945 B2
(45) Date of Patent: Oct. 9, 2012

(54) AUTOMATIC CHANGE OF SYMMETRICAL ENCRYPTION KEY

(75) Inventor: Oliver Breyel, Dockonpfronn (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 768 days.

(21) Appl. No.: 12/476,313

(22) Filed: Jun. 2, 2009

(65) Prior Publication Data

US 2010/0303241 A1 Dec. 2, 2010

(51) Int. Cl.
*H04L 9/08* (2006.01)
(52) U.S. Cl. ..................... 380/284
(58) Field of Classification Search .......... None
See application file for complete search history.

(56) References Cited

U.S. PATENT DOCUMENTS

2004/0083177 A1* 4/2004 Chen et al. ............ 705/50
2008/0184035 A1* 7/2008 Iyer et al. ............. 713/183

OTHER PUBLICATIONS

Barker, et al., NIST SP 800-21 2nd edition, "Guideline for Implementing Cryptography in the Federal Government", Dec. 2005, pp. 1-97.
Barker, et al., NIST SP 800-57, "Recommendation for Key Management—Part1: General", revised Mar. 2007, pp. 1-142.
NSI, X9.24/2002, "Retail Financial Services Symmetric Key Management Part 1: Using Symmetric Techniques", Nov. 8, 2002, pp. 1-71.
A. Kerckhoffs, "La Cryptographie Militaire", in Journal des Sciences Militaires, Jan. 9, 1883, pp. 5-38; http://www.cl.cam.ac.uk/users/fapp2/kerckhoffs/.
C. Shannon, "Communication Theory of Secrecy Systems", Bell System Technical Journal, vol. 28(4), 1948, pp. 656-715.
C. Shannon, "Shannon's Theory of Secrecy Systems", Eli Biham, May 3, 2005, pp. 54-67.
S. Harris, "CISSP: All-in-One Exam Guide, Fourth Edition, McGraw-Hill/Osborne 2008 Chapter 8 Cryptography, Attacks" ISBN:9780071497879, pp. 1-3.
"2.4.2 What are some of the basic types of cryptanalytic attack?" RSA Laboratories, 2009, http://www.rsa.com/rsalabs/node.asp?id=2201, pp. 1.
The Electronic Frountier Foundation, "Cracking DES", Jul. 16, 1998, pp. 1-5, http://w2.eff.org/Privacy/Crypto/Crypto_misc/DESCracker/HTML/19980716_eff_des_faq.html.
"EFF DES Cracker", Wikipedia http://en.wikipedia.org/wiki/EFF_DES_cracker, Apr. 25, 2009, pp. 1-2.
E. Biham, et al. "Differential Cryptanalysis of the Data Encryption Standard-like Cryptosystems", The Weizmann Institute of Science, Jul. 19, 1990, pp. 1-106.
M. Matsui, "The First Experimental Cryptanalysis of the Data Encryption Standard", Springer-Verlag, 1998, pp. 1-11.
W. Burr, NIST SP 800-63 Version 1.0.2. "Electronic Authentication Guidelines, Appendix A: Estimating Password Entropy and Strength", Apr. 2006, pp. 1-64.
National Security Agency, "NSA Fact Sheet NSA Suite B Cryptography", Feb. 2005, pp. 1-3.
NIST, FIPS Pub. 46-3, "Data Encryption Standard (DES)", Oct. 25, 1999, pp. 1-26.
Ansi, X9.52/1998, "Triple Data Encryption Algorithm Modes of Operation", Jul. 29, 1998, pp. 1-102.

(Continued)

*Primary Examiner* — Brandon Hoffman

(57) ABSTRACT

An encryption system and a method for automatically changing an encryption key. The key is changed in response to an amount of data that has been encrypted. When the amount of data encrypted with a first key reaches or exceeds a byte count threshold, the first key is deactivated and a new key is generated and used for subsequent data encryption.

17 Claims, 4 Drawing Sheets

OTHER PUBLICATIONS

W. Barker, NIST, SP 800-67 Version 1.1, "Recommendation for the Triple Data Encryption Algorithm (TDEA) Block Cipher", revised May 19, 2008, pp. 1-40.

NIST, FIPS Pub. 197, "Advanced Encryption Standard (AES)", Nov. 26, 2001, pp. 1-51.

* cited by examiner

AUTOMATIC CHANGE OF SYMMETRICAL ENCRYPTION KEY

BACKGROUND

Symmetric encryption algorithms use a single key to both encrypt and decrypt data. To reduce the chance for a cryptoanalytic attack the amount of data encrypted with a particular key should be limited. However, since the key must be kept available during the life of the encrypted data so that the encrypted data can be decrypted at a later time, the key cannot be changed too often or the number of keys to safely keep becomes large.

Most published key change policies are vague as to when a key should be changed. Some define a fixed time schedule for key change (i.e., daily, monthly). Others rely on the system administrator to change the key at intervals left to his discretion. All such techniques leave the encrypted data open to attack by the system administrator.

All practical encryption algorithms are considered to be breakable depending on the time and encrypted data available, crypto-system usable and plain-text selectable by the attacker. An attacker can use a number of different attacks to decrypt the data. For example, a brute-force attack tests all possible keys in order to recover the plain-text used to produce a particular encrypted text. This kind of attack is especially successful if the number of possible keys is small.

In a cipher text attack, the attacker is assumed to have access to the encrypted data. The attacker can then analyze this data to determine the key. The more data available to the attacker, the easier it is to determine the key.

In a plain-text attack, the attacker has access to at least portions of the plain-text and its encrypted version. Knowledge about the structure and format of the plain-text and knowledge about the patterns that appear in the encrypted version are sufficient to eventually determine the key. In a chosen plain-text attack, the attacker deliberately defines the structure, format and content of the plain-text to analyze any patterns that appear in the encrypted version.

Encrypted data is especially vulnerable to attack from a system administrator or security person. This person is typically responsible for changing the key at certain times but also has access to the plain-text, the encrypted text, the type of encryption algorithm, and encryption system. Even without knowing the actual key value, the system administrator can determine the key with just this information, given enough time.

There is thus a trade-off between changing the key often enough to preempt an attack while not too often that a large number of keys are generated and have to be managed. For these reasons and for other reasons that will become apparent to those skilled in the art upon reading and understanding the present specification, there is a need in the art for a way to automatically change encryption keys.

DETAILED DESCRIPTION

In the following detailed description of the present embodiments, reference is made to the accompanying drawings that form a part hereof, and in which is shown by way of illustration specific embodiments of the disclosure which may be practiced. The following detailed description is not to be taken in a limiting sense.

Figure 1:
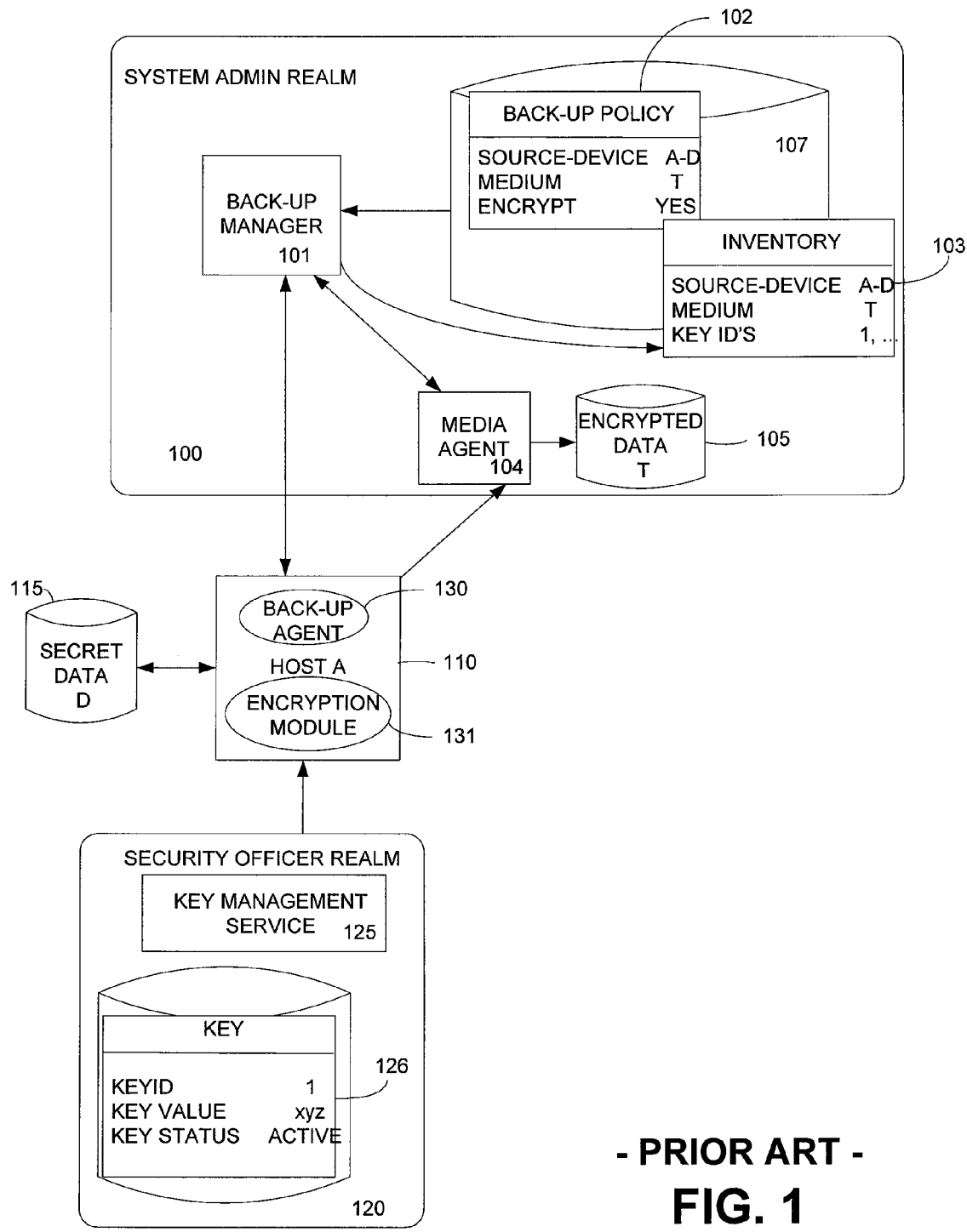
FIG. 1 depicts a block diagram of one embodiment of a typical prior art encryption system.

FIG. 1 illustrates a block diagram of a typical prior art encryption system. This system is comprised of a system administrator realm 100 and a security office realm 120 that both have access to the host 110.

In this system, the back-up manager 101 reads the back-up policy 102 from a central database 107. The back-up policy 102 is comprised of the source device for the secret data to be encrypted, the location of the medium to which the secret data is to be backed up, and whether the secret data is to be encrypted prior to the back-up operation.

The back-up manager 101 initiates operation of the back-up agent 130 on the host system 110. The back-up manager 101 also instructs the host 110 to read the secret data from the storage device 115, encrypt the secret data with the active encryption key value in the encryption module 131 of the host 110, and transmit the encrypted data to the media agent 104 that is part of the system administrator's realm 100.

As part of the encryption operation, the host accesses the security officer realm 120 to get the active key identification and value 126 from the key management service 125. The back-up agent 130 on the host 110 reads the secret data from the storage medium 115, encrypts the data with the key value, and sends the encrypted data with the key identification to the media agent 104.

The key identification is used to enable all of the process involved in the encryption and decryption of data to know which key is being used. For example, all of the processes involved know that key #1 is a certain value. In the future when the data is restored by decryption, the decrypting routine knows to use that particular key value associated with key #1. Thus the key value can be communicated to different routines without actually transmitting the actual key value.

The back-up manager 101 initiates the media agent 104 operation and instructs the media agent 104 to wait for the data stream from the back-up agent 130 on the host 110. The media agent 104 writes the received encrypted data stream and the key identification to the storage medium 105 for back-up.

After the back-up agent 130 has read, encrypted, and transmitted all of the data to the media agent 104, it ends communication with the media agent 104, returns status to the back-up manager 101, and exits the back-up routine. When the media agent 104 determines that the back-up agent 130 has ceased communication, it stops writing to the back-up medium 105 and returns, to the back-up manager 101, the back-up agent identification, the device identification, the key identification it received, and the identification of the medium to which it wrote the encrypted data. The back-up manager 101 then updates the inventory 103 at the central database 107 with this received information.

The net result of such an encryption session is that the back-up storage medium 105 contains the encrypted secret data and the key identification but not the key value. The inventory 103 is used for future restore sessions and contains the location of the medium with the encrypted data, the source of the secret data, and key identification. During future restore, the key identification is used to access the key value through the key management service 125 for decryption.

The system of FIG. 1 is open to a plain-text attack by the system administrator. The system administrator can use chosen plain-text to determine the encryption key and decipher the secret, backed-up data.

Figure 2:
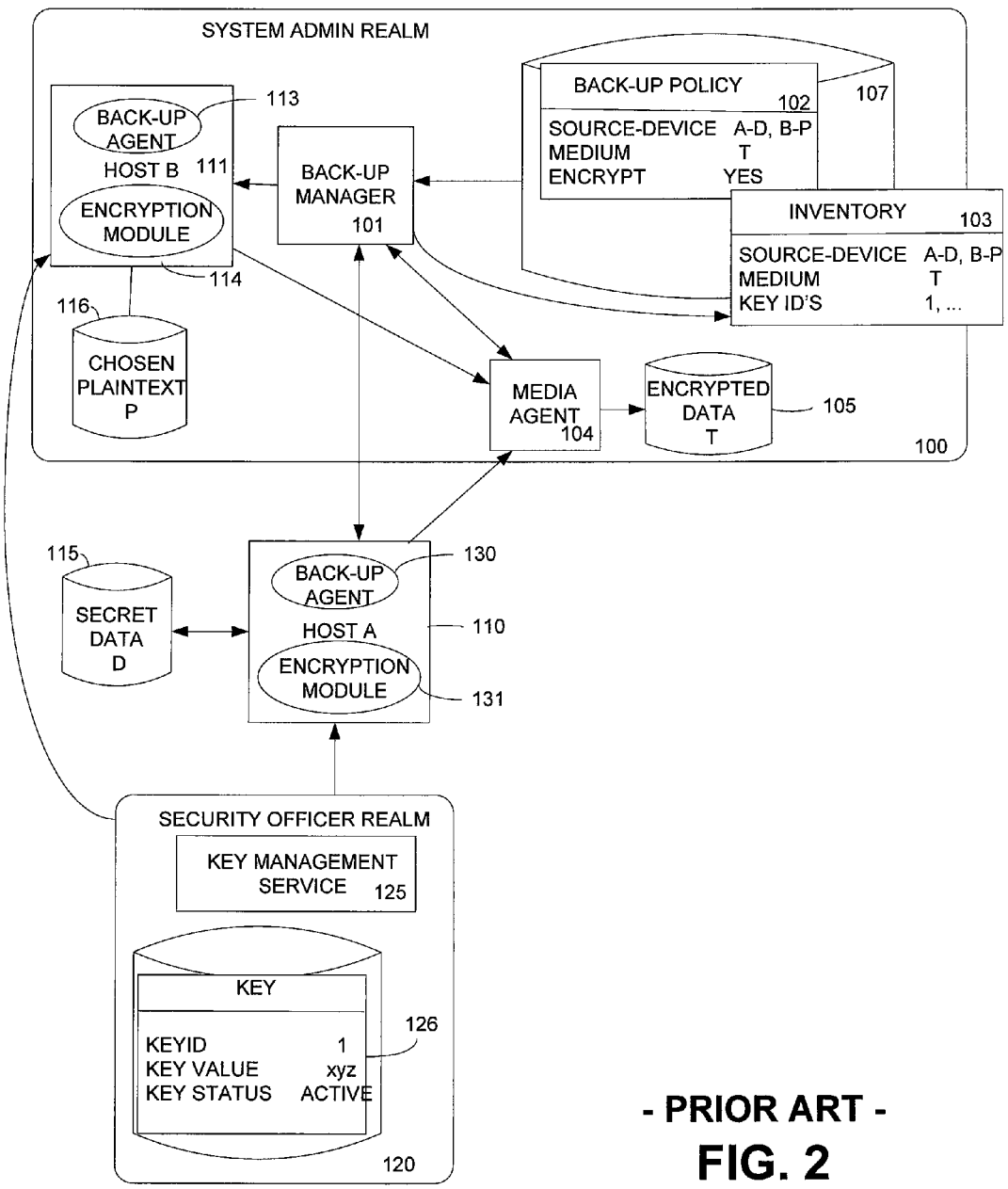
FIG. 2 a block diagram of one embodiment of a typical prior art chosen plain-text attack by a system administrator.

FIG. 2 illustrates a block diagram of a typical prior art plain-text attack by a system administrator. In this attack, the system administrator sets up a second host 111 with its own back-up agent 113 and encryption module 114. The system administrator also sets up a storage medium 116 that stores deliberately defined plain-text.

The back-up manager 101 reads the back-up policy 102 from the central database 107. The back-up manager also initiates the back-up agent 113, 130 on both hosts 111, 110 and instructs the hosts 111, 110 to read data from the data storage mediums 115, 116, encrypt with the active key, and send the encrypted data to the media agent 104. The back-up manager 101 also initiates the media agent 104 and instructs it to wait for data streams from the back-up agents 113, 130 on hosts 111, 110 and to write to a particular medium 105.

When the back-up session starts, the back-up agents 113, 130 both request the active keys identification and value 126 from the key management service 125 that is part of the security officer realm 120. The original back-up agent 130 on the original host 110 read the authentic secret data from the storage medium 115, The back-up agent 130 then encrypts this data and sends the encrypted data and the corresponding key identification to the media agent 104. The back-up agent 113 set up by the system administrator does the same thing with the chosen plain-text from the second storage medium 116. Both the chosen plain-text and the authentic secret data are encrypted with the same key value. The media agent 104 writes the key identification and the encrypted data to the back-up storage medium 105.

After the original back-up agent 130 has read, encrypted, and sent all of the secret data to the media agent 104, it terminates communication with the media agent 104, returns status to the back-up manager 101, and exits. The system administrator's back-up agent 113 does the same thing.

When the media agent 104 determines that both back-up agents 113, 130 have terminated communications, it stops writing to the back-up medium 105, returns the back-up agent identifications to the back-up manager 101, and also returns the medium identifications, the key identification it received, and the identification of the medium to which it wrote the encrypted data. The back-up manager 101 can then update the inventory 103 with the updated information for the key identification, the back-up medium identification, and the sources 115, 116 of the secret data.

The result of this back-up operation is that the back-up storage medium 105 now contains the key identification of the encrypted secret data 115 with the same key that encrypted the known plain-text. Since the system administrator can now compare both the known plain-text data and the resulting encrypted data, the key can be determined.

The present embodiments of the automatic symmetrical encryption key changing method can be used to defend against such a plain-text attack. The method is based on the fact that there are practical limits for an attacker to break an encryption key. These limits depend on the security of the encryption algorithm, the security strength of the key, and the amount of encrypted data that is encrypted by the same key. Once an encryption algorithm is chosen and the security strength of the key is determined by the implementation (i.e., security level necessary for the type of data to be protected), then the amount of data encrypted with a particular key is the variable to be used. Thus, the encryption key is changed based on the amount of data encrypted with that particular key.

Figure 3:
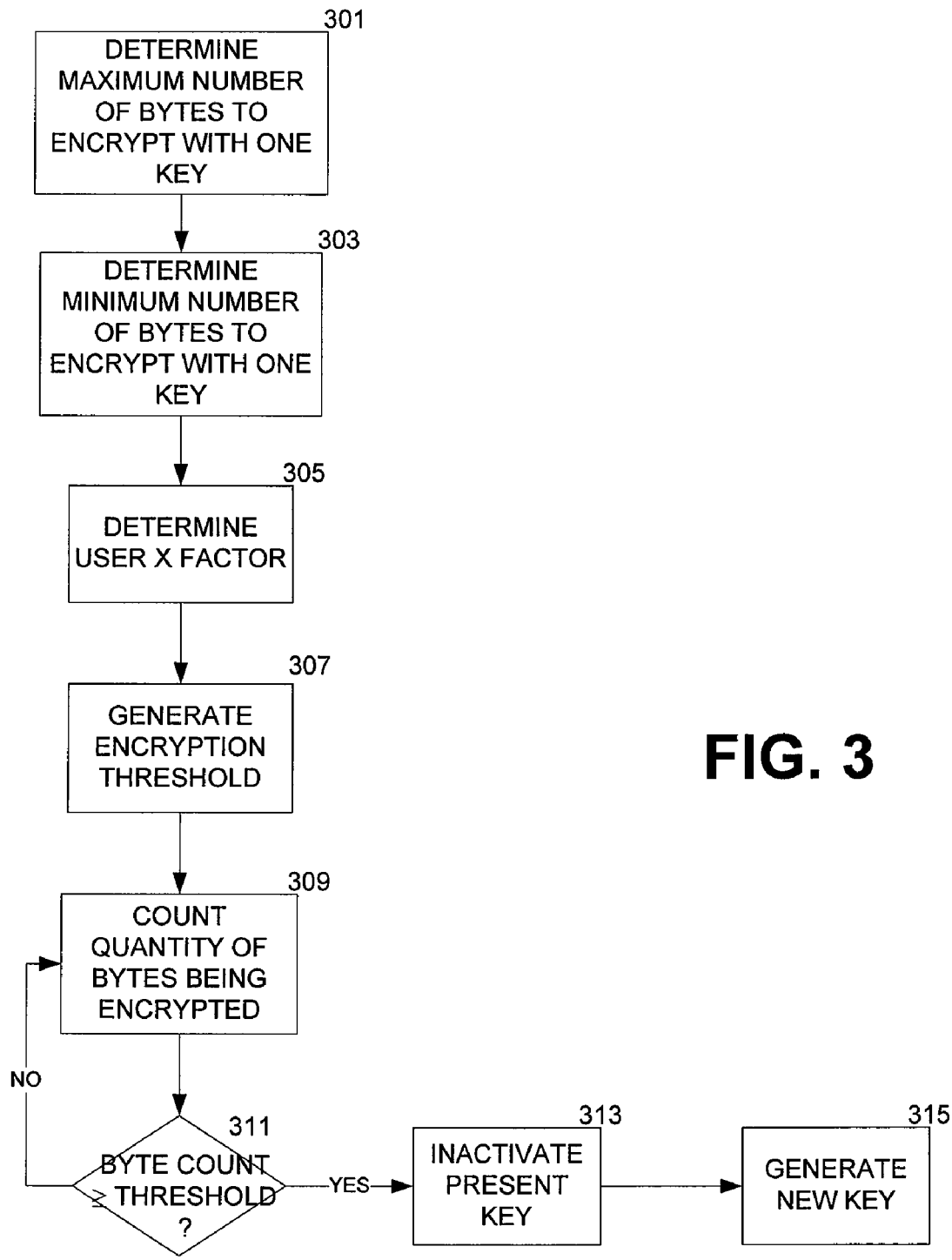
FIG. 3 depicts a flow chart of one embodiment of the method for automatic change of symmetrical encryption key.

FIG. 3 illustrates a flow chart of one embodiment of the method for automatic change of an encryption key. An indication of the maximum number of bytes ($Data_{max}$) to be encrypted with one key is determined 301. This upper byte count limit may be different for different encryption algorithms. For example, since a DES algorithm is less secure than an AES algorithm, $Data_{max}$ for the DES algorithm might be less than $Data_{max}$ for the AES algorithm.

In one embodiment, to allow for a buffer of security, the actual threshold to trigger the key change is less than $Data_{max}$. The lower the threshold, the more often the active key is changed and the more secure the encrypted data is protected against attacks in general and plain-text attacks in particular. However, it should be noted that $Data_{max}$ should not be less than the lower byte count limit $Data_{min}$ for best operation of the method for automatic change of the encryption key.

An indication of the minimum number of bytes ($Data_{min}$) to be encrypted with one active key is also determined 303. If the threshold is lower than $Data_{min}$, a large number of keys would be generated. Since the keys need to be available for decryption during restore of the data, these keys should be kept until the data is no longer needed. Thus, for practical purposes, a trade-off needs to be made between security and the number of inactive keys to manage.

The number of bytes encrypted with a certain active key is then in the range of $Data_{min}$ to $Data_{max}$. The threshold, T, for a key change is in this range and is set by a user input "x" 305. The "x" factor is computed by $0 \leq x \leq x_{max}$ and $x \in \{0,N\}$, $x_{max} \in \{N\}$ where N is the set of natural numbers. The encryption threshold, T, is then generated 307 by the equation $T = Data_{min} + ((Data_{max} - Data_{min})/x_{max})*x$.

As illustrated subsequently with reference to FIG. 4, the number of bytes being encrypted is counted 309 as the encryption progresses. After each byte, the byte counter is incremented and the count is compared to the threshold T 311. If the threshold has not been reached, the encryption continues with the present active key 309. If the number of bytes encrypted by the present key has reached or exceeded the threshold 311, the present key is inactivated 313 and a new key is generated 315. This new key is then used for encrypting the next byte of data.

Figure 4:
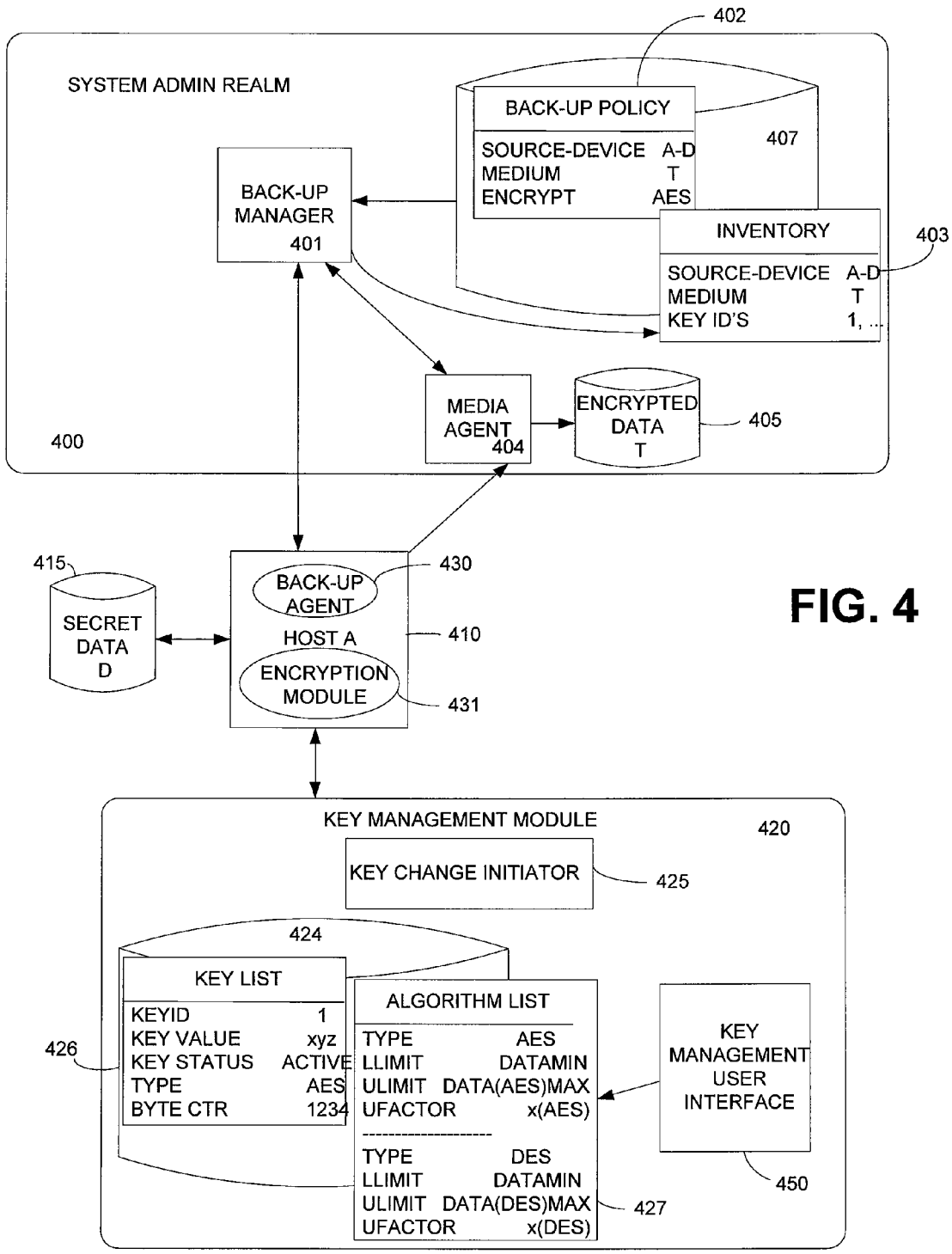
FIG. 4 depicts a block diagram of one embodiment of an encryption system incorporating an embodiment of a method for automatic change of symmetrical encryption key.

FIG. 4 illustrates a block diagram of one embodiment of an encryption system incorporating the embodiment of the method for automatic change of symmetrical encryption key as illustrated in FIG. 3. This embodiment automatically changes the key value when the amount of data being encrypted reaches a predetermined threshold. When the number of encrypted bytes reaches the threshold, the old key is deactivated and stored for future restore operations on the encrypted data using that key. A new key is then randomly generated and the encryption of the back-up data is continued with the new key.

The system is comprised of a system administrator realm 400. The system administrator realm 400 includes a back-up manager 401 that communicates with a media agent 404 and a database 407 comprising a back-up policy 402 and an inventory 403. The media agent 404 communicates with a storage device of encrypted data T 405.

A host system A 410, in one embodiment, is a computer system that is separate from the system administrator realm 400. For example, the host system 410 might be a computer system coupled to the system administrator realm 400 over a network (e.g., Internet, Ethernet, wireless). The host A 410 is comprised of a back-up agent 430 and an encryption module 431. The host A 410 communicates with a storage device for secret data D 415.

The key management module 420 is comprised of a database 424, the key identification, key value, key status (i.e., active, inactive), key type (i.e., DES, AES) and the byte counter in a key list 426. The database 424 also includes an encryption algorithm list 427 that stores the type of encryption algorithm, the upper limit, the lower limit, and the user "x" factor.

Each algorithm has a separate user factor and maximum value. For example, in the illustrated example of FIG. 4, the AES algorithm is comprised of a lower limit (LLIMIT) of $DATA_{min}$, an upper limit of $DATA(AES)_{max}$, and a user factor of x(AES). The DES algorithm is comprised of the same lower limit of $DATA_{min}$, an upper limit of $DATA(DES)_{max}$, and a user factor of x(DES).

The $DATA_{min}$ value is determined by practical rules, i.e., if all of the encrypted data that fits onto a tape should encrypted with one key, this value is to be larger than or equal to the tape capacity. In one embodiment, the algorithm specific values for $DATA_{max}$ are hard coded values in the algorithm list 427 and are not changeable by the user. The value for each $DATA_{max}$ can be set by the vendor of the key management module and by using mathematical analysis of the security level of each encryption algorithm.

The key management module 420 is further comprised of a key change initiator 425. In one embodiment, the key change initiator 425 executes at least a portion of a method for automatic change of symmetrical encryption key as discussed previously with reference to FIG. 3. For example, the key change initiator 425 might be configured to read the BYTE CTR from the key list 426 and compare with the threshold. The incremented byte count is written back to the BYTE CTR of the key list 426. Additionally, the key change initiator 425 can be configured to generate the encryption threshold T as discussed previously.

A key management user interface 450 portion of the key management module 420 can be a keyboard or other user input device. The key management user interface 450 enables a user to input integer values for "x" (e.g., x(AES), x(DES)) in the range from 0 to $x_{max}$ for each encryption algorithm in the list 427. The user can also input other values such as the value for $DATA_{min}$ that is global for all encryption algorithms in the list 427.

The system of FIG. 4 is initialized (e.g., booted up) with the back-up manager 401 reading the back-up policy 402. The back-up policy comprises the identification of the storage medium 415 from which the secret data is read, the storage medium location 405 to which the encrypted data is to be written, and the encryption algorithm type (e.g., Data Encryption Standard (DES), Advanced Encryption Standard (AES)).

The back-up manager 401 initiates the back-up agent 430 on host A 410. The back-up manager 401 instructs the back-up agent 430 to read data from the medium location 415 encrypt the data with the AES active key, and send the encrypted data to the media agent 404.

The back-up manager 401 also initiates the media agent 404 and instructs the media agent 404 to wait for data streams from the back-up agent 430 on the host A 410. The back-up manager 401 also instructs the media agent 404 to store the encrypted data on the particular medium location T 405.

The back-up session starts with the back-up agent 430 on host A 410 requesting the active key identification and value from the key management module 420. The back-up agent 430 on host A 410 reads the secret data from device D 415, encrypts this data, and sends the encrypted data and its corresponding key ID to the media agent 404. At substantially the same time, the number of bytes is sent to the key management module 420.

The media agent 404 writes the key identification and the encrypted data to the back-up storage medium T 405. At substantially the same time, the key management module 420 compares the number of encrypted bytes with the threshold that was determined by the method illustrated in FIG. 3. If the threshold has been met, the presently active key identification is set to an inactive status in the key list 426, a new key is generated and sent to the host 410. The host system is configured to execute an encryption operation module 431 that uses this key for further encryption of additional data. Substantially simultaneous with generating the new key value, a new key entry in the key list 426 is generated and associated with the new key.

After the back-up agent 430 has read, encrypted, and transmitted all of the secret data to the media agent 404 as encrypted data, the back-up agent 430 terminates communication with the media agent 404, returns its status to the back-up manager 401, and exits the process.

When the media agent 404 notices that the back-up agent 430 has terminated communication, the media agent 404 terminates writing to the back-up storage medium T 405 and returns the back-up agent identification, device identification, key identification, and back-up medium 405 identification to the back-up manager 401. It is possible that more than one key was used during the back-up/encryption session. In this case all of the key identifications would be communicated to the back-up manager 401. The back-up manager 401 then updates the inventory information 403 with the information that it has just received from the media manager 404.

The inventory information 403 is used later in a restore/decryption operation. The inventory information 403 contains data relating to the identity of the back-up storage medium 405 that stores the encrypted data, the source of the secret data prior to encryption, and the key identifications for the data stored on that particular back-up storage medium 405.

What is claimed is:

1. A method for changing an encryption key, the method comprising:
   encrypting data using a first encryption key;
   counting bytes of the data in order to determine an amount of data encrypted with the first encryption key; and
   changing from the first encryption key to a second, different encryption key for encrypting subsequent data in response to the amount of data encrypted with the first encryption key wherein a byte count threshold for switching from the first encryption key to the second encryption key is determined in response to a byte count range between an upper byte count limit and a lower byte count limit wherein the byte count threshold is determined by $Data_{min}+((Data_{max}-Data_{min})/x_{max})*x$ where $Data_{min}$ is the lower byte count limit, $Data_{max}$ is the upper byte count limit, and $x_{max} \in \{N\}$ where N is a set of natural numbers.

2. The method of claim 1 wherein the encryption key is a symmetrical encryption key.

3. The method of claim 1 wherein encrypting the data comprises performing one of a Data Encryption Standard or an Advanced Encryption Standard encryption.

4. The method of claim 3 wherein an upper byte count limit is lower for the Data Encryption Standard encryption than an upper byte count limit for the Advanced Encryption Standard encryption.

5. A method for changing an encryption key, the method comprising:
   determining a maximum number of bytes to encrypt with a first encryption key;

determining a minimum number of bytes to encrypt with the first encryption key;
determining a byte count threshold between the minimum number of bytes and the maximum number of bytes;
counting a number of bytes being encrypted by an encryption operation using the first encryption key;
inactivating the first key when the number of bytes being encrypted reaches a byte count threshold; and
generating a second key for encrypting subsequent data;
wherein the byte count threshold is determined by $Data_{min}+((Data_{max}-Data_{min})/x_{max})*x$ where $Data_{min}$ is the minimum number of bytes to encrypt with the first encryption key, $Data_{max}$ is the maximum number of bytes to encrypt with the first encryption key, x is a user input such that $x \in \{0, N\}$, and $x_{max} \in \{N\}$ where N is a set of natural numbers.

6. The method of claim 5 wherein generating the second key comprises generating a key identification, a key value, and a key type.

7. The method of claim 5 wherein counting the number of bytes being encrypted comprises:
incrementing a byte count after each byte is encrypted; and
comparing the byte count to a predetermined threshold.

8. The method of claim 5 and further comprising storing a key identification of the first key with data encrypted using the first key.

9. The method of claim 5 and further comprising determining a back-up policy that includes a source for secret data to be encrypted, a destination medium for encrypted data, and an encryption type.

10. The method of claim 5 and further comprising performing the encryption operation on additional data using the second key.

11. An encryption system comprising:
a back-up manager for managing back-up of secret data;
a back-up medium coupled to the back-up manager, the back-up medium configured to store encrypted data;
a host system coupled to the back-up manager, the host system configured to execute an encryption operation using an active encryption key such that the secret data is encrypted and stored on the back-up medium; and
a key management module coupled to the host system and configured to compare a byte count to a threshold and deactivate a first encryption key and activate a second encryption key, to be used as the active encryption key, in response to the byte count being equal to or greater than the threshold wherein the threshold is determined in response to a byte count range between an upper byte count limit and a lower byte count limit wherein the threshold is determined by $Data_{min}+((Data_{max}-Data_{min})/x_{max})*x$ where $Data_{min}$ is the lower byte count limit, $Data_{max}$ is the upper byte count limit, $x \in \{0, N\}$, and $x_{max} \in \{N\}$ where N is a set of natural numbers.

12. The encryption system of claim 11 wherein the host system is coupled to the back-up manager over a network.

13. The encryption system of claim 11 and further comprising a central database coupled to the back-up manager, the central database configured to store a back-up policy and inventory information.

14. The encryption system of claim 11 wherein the key management module is further configured to comprise a key list and an encryption algorithm list.

15. The encryption system of claim 14 wherein the key list comprises a key identification, a key value, a key status, and a byte counter.

16. The encryption system of claim 14 wherein the encryption algorithm list comprises an encryption operation type, a byte counter upper limit, a byte counter lower limit, and a user input factor for each type of encryption algorithm.

17. The encryption system of claim 11 wherein the back-up medium is configured to store a key identification.

* * * * *